US012756643B2

(12) United States Patent
Szucs

(10) Patent No.: US 12,756,643 B2
(45) Date of Patent: Oct. 6, 2026

(54) TERMINAL DEVICE, INFRASTRUCTURE EQUIPMENT AND METHODS

(71) Applicant: Sony Group Corporation, Tokyo (JP)

(72) Inventor: Paul Szucs, Lund (SE)

(73) Assignee: Sony Group Corporation, Tokyo (JP)

( * ) Notice: Subject to any disclaimer, the term of this patent is extended or adjusted under 35 U.S.C. 154(b) by 435 days.

(21) Appl. No.: 18/018,467

(22) PCT Filed: Jul. 15, 2021

(86) PCT No.: PCT/GB2021/051818
§ 371 (c)(1),
(2) Date: Jan. 27, 2023

(87) PCT Pub. No.: WO2022/034281
PCT Pub. Date: Feb. 17, 2022

(65) Prior Publication Data

US 2023/0318951 A1 Oct. 5, 2023

(30) Foreign Application Priority Data

Aug. 13, 2020 (GB) ...................................... 2012677

(51) Int. Cl.
*G06F 15/173* (2006.01)
*H04L 43/08* (2022.01)
(Continued)

(52) U.S. Cl.
CPC .............. *H04L 43/08* (2013.01); *H04L 65/60* (2013.01); *H04W 24/08* (2013.01); *H04W 24/10* (2013.01)

(58) Field of Classification Search
CPC ........ H04L 43/08; H04L 65/60; H04W 24/08; H04W 24/10
See application file for complete search history.

(56) References Cited

U.S. PATENT DOCUMENTS

| | | | | |
|---|---|---|---|---|
| 2008/0228912 | A1* | 9/2008 | Vedantham ........ | H04N 21/6582 709/224 |
| 2011/0090399 | A1* | 4/2011 | Whitaker ............... | G06F 16/78 707/769 |

(Continued)

FOREIGN PATENT DOCUMENTS

| | | | |
|---|---|---|---|
| CN | 101341713 | A | 1/2009 |
| WO | WO-2011158221 | A2 | 12/2011 |

(Continued)

OTHER PUBLICATIONS

3GPP, TS26.501 v16.4.0, 5G Media Streaming (5GMS); General description and architecture (3GPP server publication date: Jul. 17, 2020).

(Continued)

*Primary Examiner* — Duyen M Doan
(74) *Attorney, Agent, or Firm* — Tucker Ellis LLP

(57) ABSTRACT

A method of metrics collection and reporting in a service based architecture media streaming network, the method comprising the steps of: providing a metrics collection and reporting configuration framework to an application function using a media streaming provisioning interface, the metrics collection and reporting configuration framework defining the metrics to be collected and reported for a media session over the media streaming network.

20 Claims, 9 Drawing Sheets

(51) Int. Cl.

| | |
|---|---|
| ***H04L 65/60*** | (2022.01) |
| ***H04W 24/08*** | (2009.01) |
| ***H04W 24/10*** | (2009.01) |

(56) References Cited

U.S. PATENT DOCUMENTS

| | | | | |
|---|---|---|---|---|
| 2012/0151009 | A1* | 6/2012 | Bouazizi | H04N 21/4424 709/219 |
| 2012/0218887 | A1* | 8/2012 | Khilnani | H04L 47/22 370/230 |
| 2013/0326551 | A1* | 12/2013 | Chatterjee | H04L 5/0035 725/9 |
| 2014/0079057 | A1* | 3/2014 | Groves, Jr. | H04L 43/04 370/392 |
| 2016/0088322 | A1* | 3/2016 | Horev | H04N 21/2402 725/14 |
| 2017/0302722 | A1* | 10/2017 | Porokh | H04L 65/70 |
| 2023/0292226 | A1* | 9/2023 | Bouazizi | H04W 12/06 |

FOREIGN PATENT DOCUMENTS

| | | | |
|---|---|---|---|
| WO | 2016205697 | A1 | 12/2016 |
| WO | 2019174588 | A1 | 9/2019 |

OTHER PUBLICATIONS

BBC, et al , "Consolidated changes from SA4#108-e and SA4#109-e" , 3GPP TSG-SA WG4 Meeting #109-e S4-200882 , Jun. 1, 2020.

International Search Report and Written Opinion from corresponding International Search Report PCT/GB2021/051818, mailed on Oct. 18, 2021, 18 pages.

Search Report from corresponding Application No. GB2012677.7, dated May 11, 2021, 4 pages.

3rd Generation Partnership Project, "Technical Specification Group Services and System Aspects; 5G Media Streaming; Protocols (Release 16)", 3GPP TS 26.512, V1.2.0, dated May 2020, 55 pages.

3rd Generation Partnership Project, "Technical Specification Group Services and System Aspects; Transparent end-to-end Packet-switched Streaming Service (PSS); Protocols and codecs (Release 16)", 3GPP TS 26.234, V16.0.0., Mar. 2020, 174 pages.

3rd Generation Partnership Project, "Technical Specification Group Services and System Aspects; System architecture for the 5G System (5GS); Stage 2 (Release 16)", 3GPP TS 23.501, V16.7.0, Dec. 2020, 450 pages.

3GPP TS 26.247 version 16.3.0 Release 16, Universal Mobile Telecommunications System (UMTS); LTE; Transparent end-to-end Packet-switched Streaming Service (PSS); Progressive Download and Dynamic Adaptive Streaming over http (3GP-DASH), Sep. 2020, 142 pages.

3rd Generation Partnership Project, "Technical Specification Group Services and System Aspects; 5G Media Streaming (5GMS); General Description and Architecture (Release 16)", 3GPP TS 26.501, V16.3.0, Mar. 2020, 63 pages.

Holma H. et al., "LTE for UMTS OFDMA and SC-FDMA Based Radio Access", John Wiley and Sons, 2009, 4 pages.

R. Fielding, Ed et al., "Hypertext-Transfer Protocol (HTTP/1.1): Message Syntax and Routing", IETF RFC 7230, Jun. 2014, 89 pages.

R. Fielding, Ed et al., "Hypertext-Transfer Protocol (HTTP/1.1): Semantics and Content", IETF RFC 7231, Jun. 2014, pp. 101.

3rd Generation Partnership Project, "Technical Specification Group Core Network and Terminals; 5G System; Policy and Charging Control signalling flows and QoS parameter mapping; Stage 3 (Release 16)", 3GPP TS 29.513, V16.1.0, Sep. 2019, 94 pages.

CTA 2066, "Streaming Quality of Experience Events, Properties and Metrics," Feb. 21, 2019, 19 pages.

3GPP TSG-SA WG4 Codec, "Stage 2 for Media Session Establishment; Interactions with Policy Control", S4-AHI840, Sep. 10, 2019.

Sony Europe B.V., "UE-internal interfaces", S4-200285, Jan. 27, 2020.

Tencent, "Correction on Media Architecture", S4-200809, May 19, 2020.

Tencent, "Correction on Metrics collection and reporting", S4-200812, May 19, 2020.

* cited by examiner

TERMINAL DEVICE, INFRASTRUCTURE EQUIPMENT AND METHODS

BACKGROUND

Field of Disclosure

The present disclosure relates to a terminal device, infrastructure equipment and methods.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "5G Media Services Architecture" (5GMSA). This is described in [1]. The 5GSMA is designed to offer a simpler and more modular design enabling services with different degrees of co-operation between Third-Party content and service providers, broadcasters and the like. This architecture is referred to as a service based architecture media streaming network in the Art. This modular system is different to other systems which are very prescriptive in the mechanisms for delivering media content to consumers. These prescriptive systems specify many, if not all aspects of the end-to-end service architecture, its complete set of features, and the methods to facilitate the service, for example media formats, metadata formats, delivery protocols, methods to configure, monitor performance and maintain the service, etc. Accordingly, there is a desire to adopt the more flexible service based architecture media streaming network, whereby a media streaming service provider can implement their service more in line with their own preferences as regards media formats, metadata formats, the set of service features, etc. The present disclosure relates to this more flexible architecture.

In this architecture Metrics Reporting is mentioned at Clause 5.5 of [1]. Specifically, two forms of Metrics Reporting are mentioned. The first is using a so-called "In-Band" mechanism and the second is using a so-called "Out-of-Band" mechanism. The in-band mechanism is where the metrics reporting occurs with the content manifest and is described in Clause 5.5.3 and the out-of-band mechanism is where the metrics reporting occurs separately from the content manifest and is described in Clause 5.5.2. Both of these described mechanisms have disadvantages that will be now described.

The in-band mechanism is performed via the Application Server (AS) and so is in the User Plane. This means that the sequence of events to acquire the Quality of Experience (QoE) metrics (which are provided in the Metrics Reporting) is complex as regards the overall framework of media services provision in 5GMS. In particular, it is illogical that the Media Player requests metadata from the Application Server and metrics configuration is included in the returned metadata. The metrics configuration is then therefore passed from the Media Player to the Media Session Handler, which then requests the creation of a metrics job in the Media Player in accordance with the passed configuration.

Moreover, there is a discrepancy in FIG. 4.2.2-2 in [1] in that the function Metrics Reporting is communicated between the Media Session Handler in the UE and the 5GMSd Application Function. However, this is inconsistent with the description where it is quite clear that the in-band method of metrics reporting configuration involves provision of the configuration data via interface M4d, between the 5GMSd Application Server and the Media Player in the UE.

The complexity and lack of flexibility with which Metrics Reporting is carried out using the in-band mechanism means that service providers are unlikely to utilize it. Additionally, this complexity increases the amount of signaling and processing required by the network and the UE.

However, the in-band mechanism is used in [3], where the latest working draft (at the time of writing) in Clause 4.7.5 states that Metrics Reporting is controlled by a "Operations, Administration and Maintenance" server which is any kind of server that is provisioned for that purpose and is not an entity that is identifiable in the 5GMS architecture. Moreover, in Clause 4.9.2, the Metrics Reporting is sent to the UE in-band and further, will only work for metrics defined in that particular format (i.e. is conformant with TS26.247 noted in [2], which itself is based on MPEG-DASH. This linking of the Metrics Reporting to the format of the content (as required in in-band Metrics Reporting) goes against the flexibility of the system described in [1].

With regard to the out-of-band reporting, the Metrics Reporting occurs in the network control plane. Specifically, as noted in [2], the Metrics Reporting occurs as RRC messages. This has at least one disadvantage. In many instances, a Service Provider that is delivering a Media Stream or content to which the Metrics Reporting applies are not sent the QoE metrics directly. This increases the complexity of the system as additional intelligence is required in order to relay the QoE metrics reports to the interested party (the Service Provider).

Accordingly, it is an aim of the present disclosure to provide a metrics reporting mechanism that maintains the flexibility of the service based architecture media streaming network whilst also allowing the Service Provider to receive the QoE metrics directly.

SUMMARY OF THE DISCLOSURE

The present disclosure can help address or mitigate at least some of the issues discussed above as defined in the appended claims.

According to embodiments of the disclosure, there is provided a method of metrics collection and reporting in a service based architecture media streaming network, the method comprising the steps of: providing a metrics collection and reporting configuration framework to an application function using a media streaming provisioning interface, the metrics collection and reporting configuration framework defining the metrics to be collected and reported for a media session over the media streaming network. Other features and embodiments are described in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
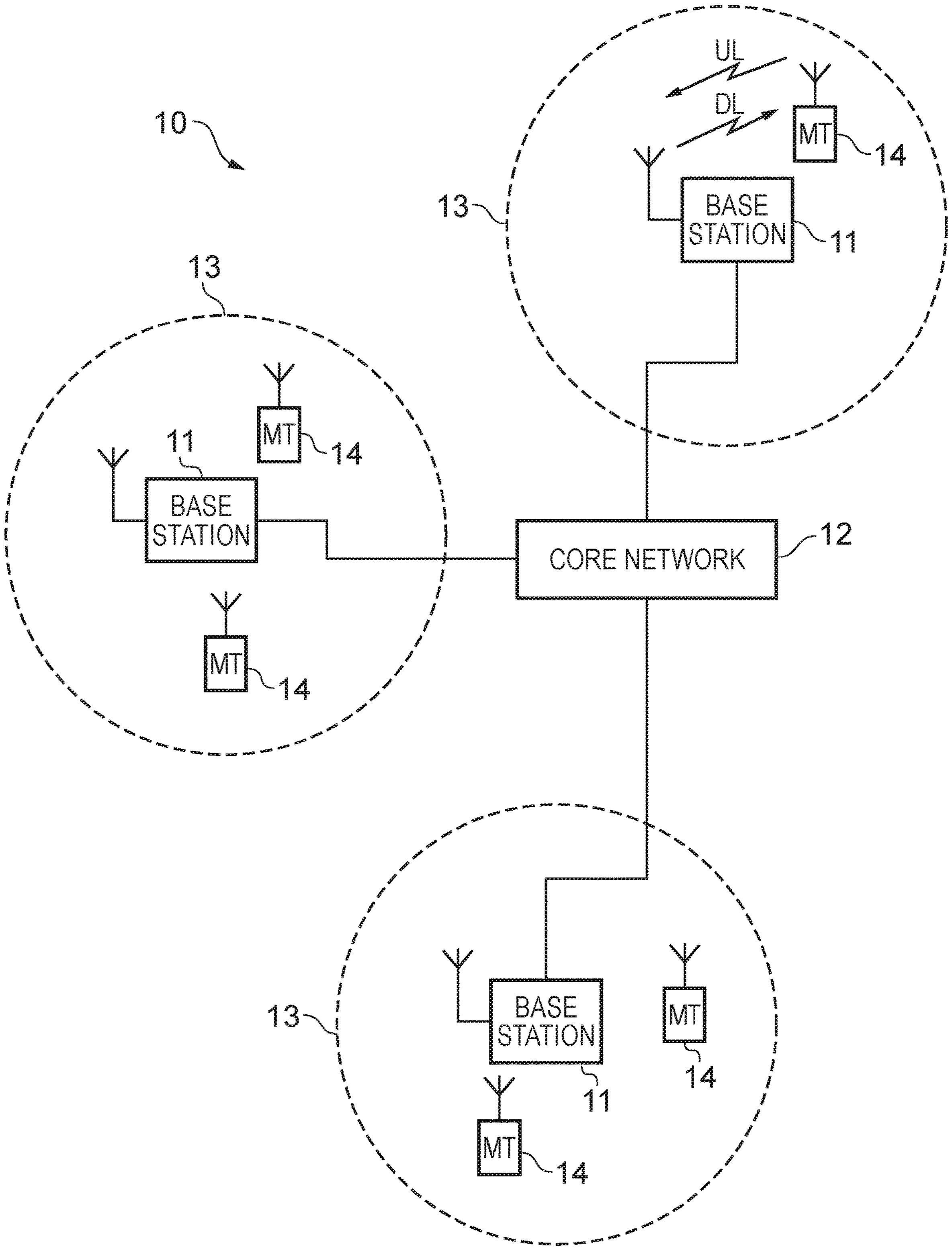
FIG. 1 schematically represents some aspects of an LTE-type or 5G-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [3]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);

Massive Machine Type Communications (mMTC);

Ultra Reliable & Low Latency Communications (URLLC); and

Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 1 ms or 0.5 ms with reliability of 99.999% to 99.9999%.

The elements of the wireless access network shown in FIG. 1 may be equally applied to a 5G new RAT configuration, except that a change in terminology may be applied as mentioned above.

Figure 2:
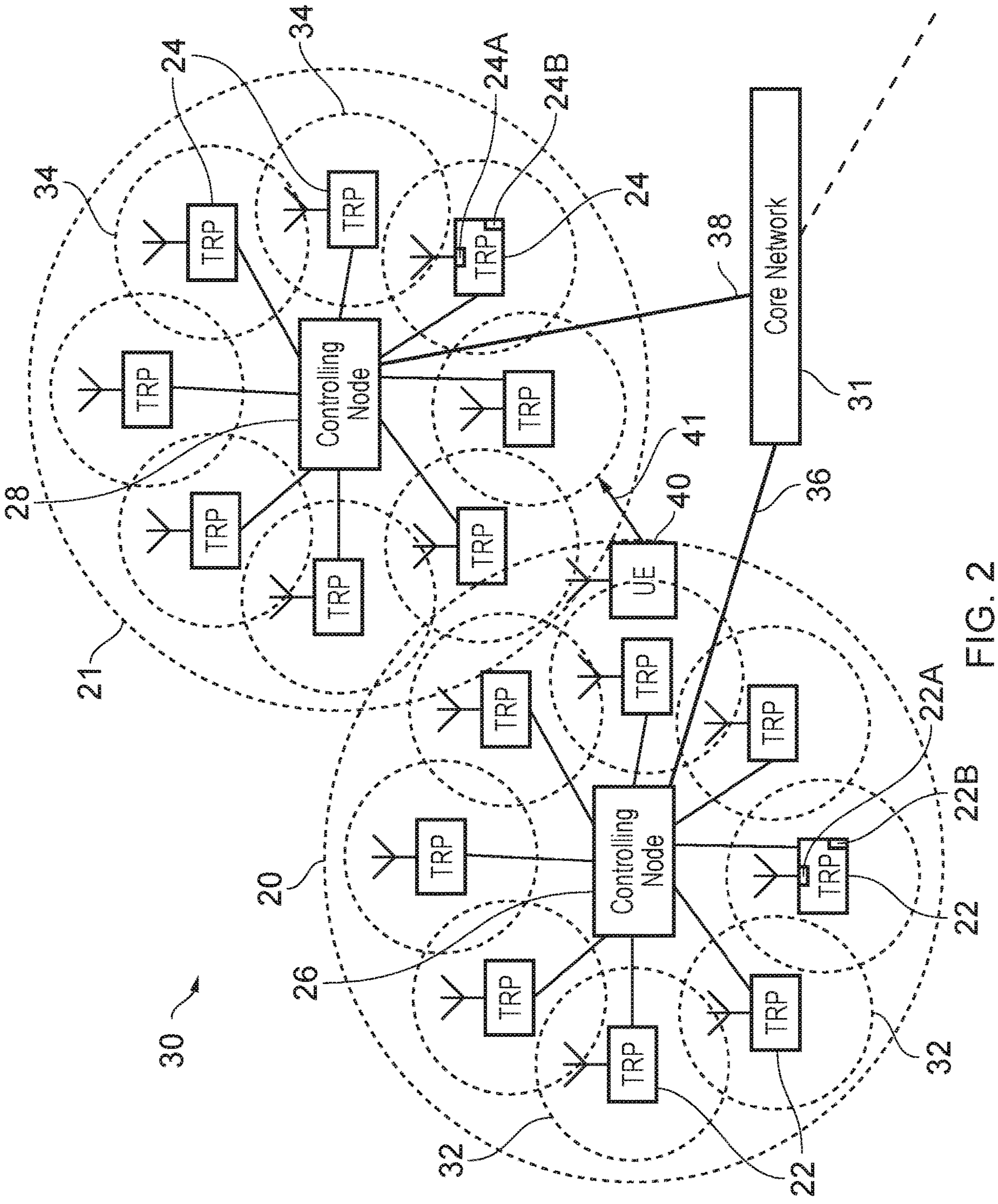
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22*a*, 24*a* for transmission and reception of wireless signals and processor circuitry 22*b*, 24*b* configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 14 is represented in FIG. 2 within the coverage area of the first communication cell 20. This terminal device 14 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 14 at any given time (i.e. which of the distributed units are currently active distributed units for the terminal device). Typically this will be based on measurements of radio channel conditions between the terminal device 14 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 14. That is to say, in some cases the terminal device may not be aware of which distributed unit is responsible for routing communications between the terminal device 14 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 14 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
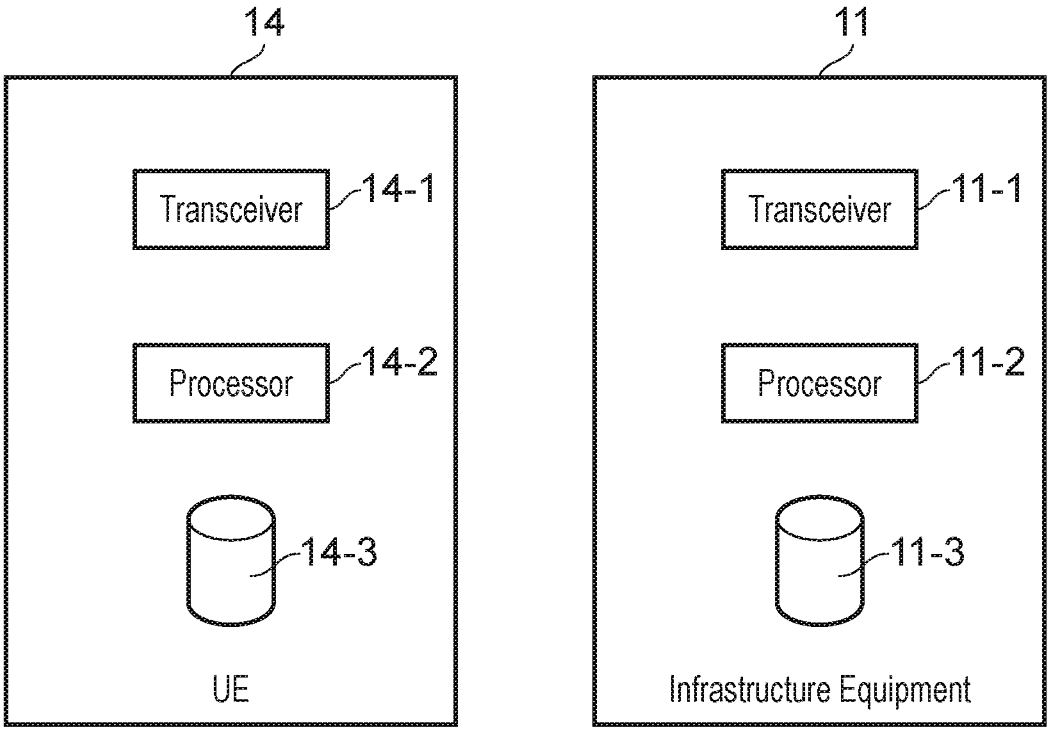
FIG. 3 shows schematically the terminal device 14 and infrastructure equipment 11 of FIG. 1.

FIG. 3 shows schematically the terminal device 14 and infrastructure equipment 11 of FIG. 1. The terminal device 14 includes a transceiver 14-1 which communicates with the infrastructure equipment 11 wirelessly. The transceiver 14-1 is controlled by processing circuitry 14-2 located within terminal device 14. The processing circuitry 14-2 may be embodied as any kind of circuitry such as an application specific integrated circuit or the like or may be a microprocessor. The processing circuitry 14-2 is itself controlled by software code which is stored on storage 14-3. The storage 14-3 is typically embodied as solid state circuitry designed to store program code.

Similarly, the infrastructure equipment 11 includes a transceiver 11-1 which communicates with the infrastructure equipment 11 wirelessly. The transceiver 14-1 is controlled by processing circuitry 14-2 located within infrastructure equipment 11. The processing circuitry 11-2 may be embodied as any kind of circuitry such as an application specific integrated circuit or the like or may be a microprocessor. The processing circuitry 11-2 is itself controlled by software code which is stored on storage 11-3. The storage 11-3 is typically embodied as solid state circuitry designed to store program code.

Figure 4:
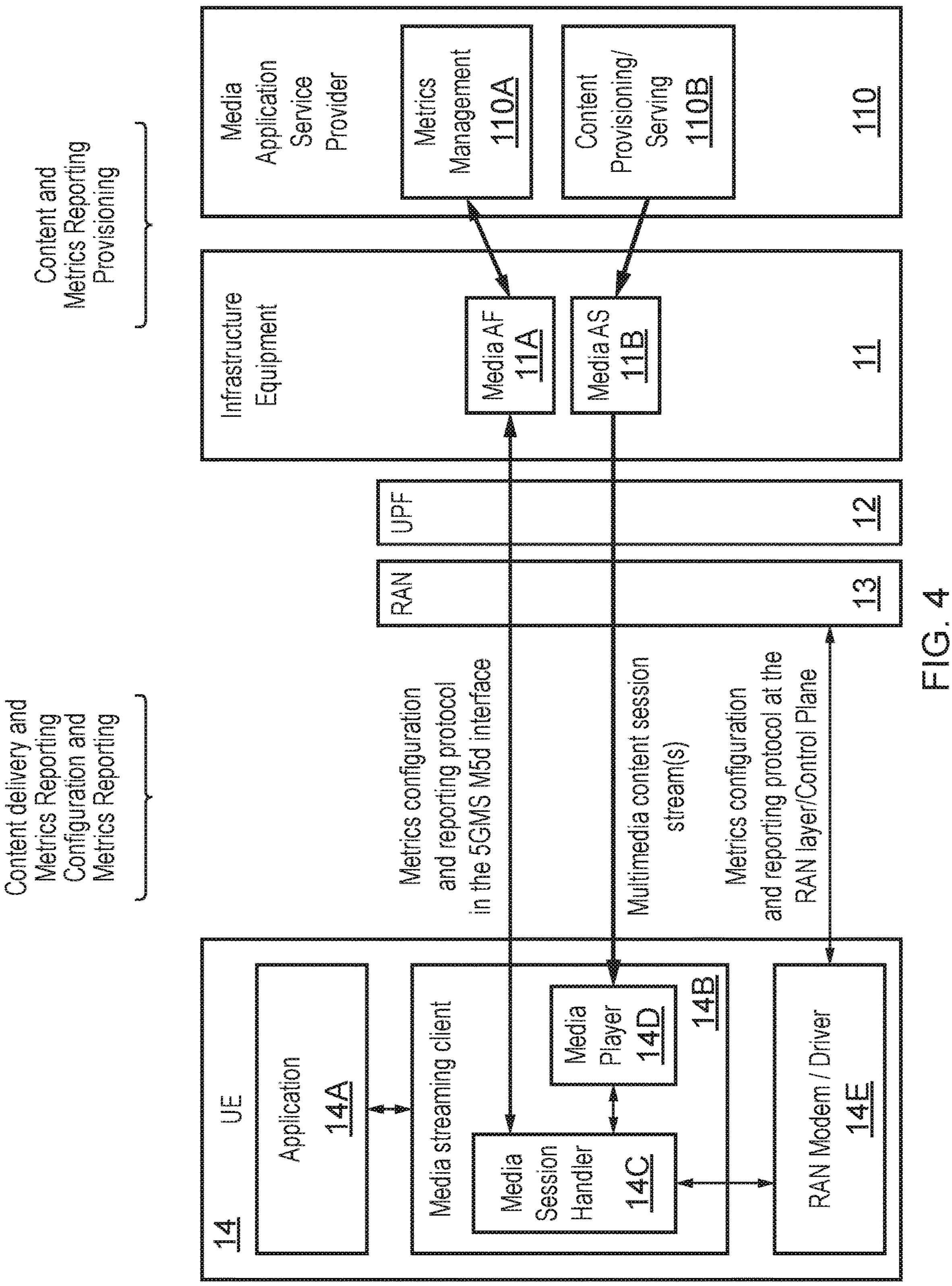
FIG. 4 schematically shows a media architecture according to embodiments of the disclosure.

FIG. 4 schematically shows a media architecture according to embodiments of the disclosure. The Application 14A and the Media Streaming Client 14B will be run on processing circuitry 14-2 within the terminal device 14. The Radio Access Network Modem/Driver 14E will be embodied on the transceiver 14-1. The 5GMS client receives a downlink media streaming service and provides an uplink Media Service that may be accessed through defined interfaces/Application Program Interfaces (APIs). The Media Streaming Client 14B contains two sub functions which will be run on processing circuitry 14-2 within the terminal device 14. The two sub-functions are a Media Session Handler 14C and a Media Player 14D. The Media Session Handler 14C is a function that establishes, controls and supports a media session within the terminal device 14 and communicates with a Media Application Function (Media AF) 11A running on the processing circuitry 11-2 within the infrastructure equipment 11. The Media AF 11A is similar to that defined in clause 6.2.10 of [4] and provides various control functions to the Media Session Handler 14C. The Media Player 14D is a function that streams the media content on the terminal device 14 and communicates with a Media Application Server (Media AS) 11B running on the processing circuitry 11-2 within the infrastructure equipment 11 and which hosts 5G media functions. It should be noted that, whilst the Media AF 11A and the Media AS 11B are shown to run on infrastructure equipment 11, this is for convenience and these are typically data network (DN) functions. Additionally shown are the User Plane Function 12 and the Radio Access Network 13. These are respective layers within the Infrastructure Equipment 11 as would be appreciated.

Additionally shown in FIG. 4 is a Media Application Service Provider 110. This is a provider of Media Content to be streamed over the network. As is shown in FIG. 4, in embodiments of the disclosure, the Media Application Service Provider includes a Metrics Management layer 110A which communicates with the Media AF 11A and a Content Provisioning/Serving Layer 110B which communicates the content to be streamed to the Media AS 11B. It should be noted, that whilst the Metrics Management layer 110A is described as communicating with the Media AF 11A, in embodiments, the Metrics Management Layer 110A communicates with a Metrics Configuration and Reporting Server AF which may be a separate entity to the Media AF 11 and thus be located on a different IP address to the Media AF 11. However, in embodiments, the Metrics Configuration and Reporting Server AF may be on the same server as the Media AF 11. The Metrics Configuration and Reporting Server AF may be AF is provided by the Mobile Network Operator (MNO) and it operates in the MNO network as a trusted entity or is provided by the Application Service Provider. It operates in the MNO network either as a trusted entity or as an external untrusted entity, depending on the relationship between the MNO and the Application Service Provider The Metrics Management layer 110A communicates a metrics collection and reporting configuration framework that defines the metrics to be collected and reported for a media session over the media streaming network to the Media AF 11A. In other words, the Metrics Management Layer 110A provides a framework which defines the metrics that the Media Content provider wishes to collect during or after the media session. The framework according to embodiments will be explained later. As will be appreciated, providing the metrics collection and reporting configuration framework separately to the media content to be streamed means that the Metrics Reporting is carried out using an Out-of-Band mechanism. However, unlike the current Out-of-Band mechanism, the metrics are defined by the Service Provider and as will now be explained, are provided directly to the Service Provider. This, as explained earlier, reduces the complexity in the system.

At the beginning of the media streaming session, the Media Application Service Provider initiates a media streaming provisioning interface. In embodiments of the disclosure the media streaming provisioning interface is the M1d (5GMS Provisioning) Interface as defined in [5], although the disclosure is not so limited. In particular, and as shown in FIG. 4, the Metric Management layer 110A provides a framework which defines the metrics to be collected and reported for the media session over the media streaming network over the media streaming provisioning interface. This is provided to the Media AF 11A.

The Media AF 11A, in embodiments, sends the metrics collection and reporting configuration framework to the UE 14 over a Media Session Handling interface which is the M5d of [4] in embodiments. Specifically, the metrics collection and reporting configuration framework is sent to the Media Session Handler 14C within the Media Streaming Client 14B within the UE 14.

Figure 5:
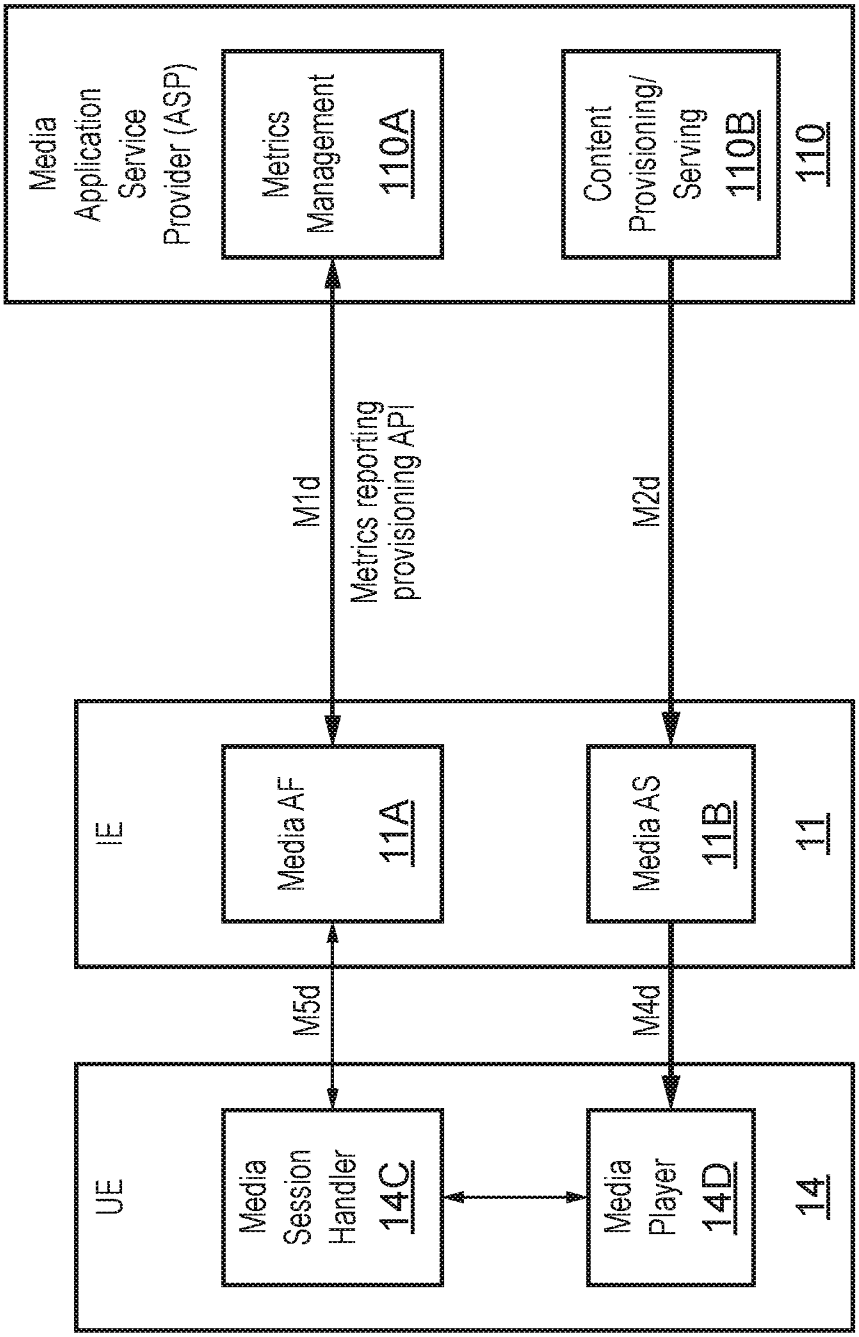
FIG. 5 shows a media architecture explaining the Media Streaming Provisioning Interface according to embodiments of the disclosure.

The Media Streaming Provisioning Interface will now be described with reference to FIG. 5. With Media Streaming (5GMS) services, the Media Application Service Provider (ASP) 110 can be an entity that is operated by a third party, i.e. it is not the MNO.

In this case the Media Streaming Provisioning Interface (M1d) is used to provision media streaming sessions to the Media AF 11A. This provisioning includes provisioning of metrics reporting configuration to the Media AF, if required by the ASP.

As would be appreciated, the M1d interface can also be used when the MNO itself acts as the ASP, but in this case the MNO could rationalize the media streaming service operation by integrating various provisioning functions into the Media AF 11A, or by using proprietary systems and interfaces to perform service provisioning, including metrics reporting provisioning. But also in this case, in embodiments, communications with the UE 14 are still performed according to the specification of the M4d and M5d interfaces.

As noted above, according to embodiments of the disclosure, the metrics reporting provisioning interface is used by the ASP to set up metrics reporting operations, if desired, for the associated media streaming and content provision service session(s).

The corresponding metrics reporting provisioning API is defined in order to realise the functionality of the metrics reporting provisioning interface.

The corresponding metrics reporting provisioning API is defined as a REST API, in accordance with embodiments. Thus the metrics reporting provisioning API uses the HTTP [8] protocol construct to exchange messages between the ASP functional entity and the Media AF 11A for metrics reporting provisioning.

The metrics reporting provisioning API is, in embodiments, accessible via a URI path that is constructed in accordance with a general framework for 5GMS APIs as already defined in [5]. The following URI base path definition is one possible model of the URI path for the metrics reporting provisioning API:

{apiRoot}/3gpp-m1d/v1/provisioning-sessions/{provisioningSessionId}/metrics-reporting-provisioning The string "metrics-reporting-provisioning" is the so-called sub-resource path of the "provisioning-sessions" API of interface M1d, in its definition of version "v1". The sub-resource path identifies the functional entity within the M1d provisioning interface, in this case for metrics reporting provisioning. "apiRoot" is set generally for deployments of the 5GMS APIs.

"provisioingSessionId" refers to the provisioning session for which metrics reporting provisioning is carried out.

Although, the exact names of resources, sub-resources and other URI path components could be chosen differently, it is desirable that some unique name is used to identify the metrics reporting provisioning API which is a necessary component of the URL path.

In line with common REST API definitions, particular HTTP methods are used to invoke REST operations to process metrics reporting provisioning. The ASP functional entity, for example the metrics management layer 110A issues such HTTP method messages to the Media AF 11A in order to provision metrics reporting at the Media AF 11A, which subsequently configures metrics reporting accordingly in all UEs that access the associated media streaming service, by establishing a media streaming session with the Media AF 11A, as described below.

The HTTP methods used in the metrics reporting provisioning API are listed in Table 1 below. This table states the intended meaning of each method in relation to metrics reporting configuration.

When the Media AF 11A receives any of the metrics reporting provisioning API HTTP messages, it processes them and responds to the ASP entity appropriately, using the known HTTP responses as defined in IETF RFC 7231 [9] and possibly further elaborated for 5GMS in [5].

All HTTP methods for the metrics reporting provisioning API apply to a particular existing media streaming session.

TABLE 1

HTTP Method Usage for the Metrics Reporting Provisioning API

| HTTP method | Operation |
|---|---|
| POST | This method is used to activate the metrics reporting procedure and to set the Metrics Reporting Configuration. |
| GET | This method is used to retrieve an existing Metrics Reporting Configuration. |
| PUT, PATCH | This method is used to modify the configuration of an existing Metrics Reporting Configuration. |
| DELETE | This method is used to deactivate the metrics reporting procedure. |

A so-called Metrics Configuration Resource is defined as a data structure that contains the configuration settings for the metrics reporting feature within a particular media streaming session. The structure and contents of the Metrics Configuration Resource are shown in Table 2. This definition of the Metrics Configuration Resource is one example of its structure and contents. In embodiments, additional elements are added as necessary for the overall functionality of metrics reporting provisioning. Further, detailed semantics of each element may be changed according to more general conventions, but the technical effect should be preserved.

UE Location is one such element that could be required but is so far not foreseen to be needed.

One further facility that is provided in embodiments is to allow separate metrics reporting server addresses for the periodic reports and the aggregate report, since it may be different entities that collect and evaluate the respective metrics reports. This possibility would be apparent to the skilled person but is not depicted explicitly in the example metrics reporting configuration resource structure shown in table 2.

Formal definitions for element Types are known from the 5GMS specifications.

TABLE 2

| MetricsReportingConfiguration Resource | | | |
|---|---|---|---|
| Property name | Type | Cardinality | Description |
| server Addresses | Array(URL String) | 1 . . . N | A list of 5GMSd AF/MCRS-AF addresses to which metrics reports shall be sent. (Opaque URL, following the 5GMS URL format.) |
| reportingInterval | DurationSec | 0 . . . 1 | The time interval, expressed in seconds, between metrics reports being sent by the Media Session Handler. The value shall be greater than zero. If the aggregateReport element is not included in the object structure specification, then when this property is omitted, a single final report shall be sent immediately after the streaming session has ended. |
| aggregateReport | Boolean | 0 . . . 1 | If specified as an element, and included and set to "True" then the single final (aggregate) metrics report shall be sent, independently of whether periodic reports were sent. |
| samplePercentage | Percentage | 0 . . . 1 | The proportion of clients that shall report metrics, expressed as a floating point value between 0.0 and 100.0. If not specified, all clients shall send metrics reports. |
| urlFilters | Array(String) | 1 . . . N | A list of filter conditions, e.g. URL patterns for which metrics reporting shall be performed. If not specified, reporting shall be performed for all sessions. |
| Metrics | Object | 1 or 1 . . . N | Metrics system format and metrics (for cardinality "1"), or a list of metrics system formats and metrics which shall be reported (for cardinality "1 . . . N"). |
| metricsSystem-Identifier | String | 1 | Metrics system format identifier. |
| metricsElements | Array(String) | 0 . . . N | Metrics system format elements that are required to be reported, in the case that the complete set of elements defined within that system is not required to be reported. |

The Media Session Handling interface according to embodiments of the disclosure will now be described.

Currently, according to [5], in clause 11.2.3 on Data Model, the service access resource type contains an object element that specifies the "ClientMetricsReportingConfiguration". The "ClientMetricsReportingConfiguration" is an instruction for the UE 14 that defines the required metrics reporting. In embodiments of the disclosure, the content and structure of this object is improved.

Firstly, the current semantics allow either periodic reporting of metrics, or an aggregated report of metrics at the end of the session, but not both. In certain circumstances, it is beneficial for a service provider or other interested and authorized party to obtain both kinds of reports. This is particularly relevant in media streaming services where both kinds of report are useful. Specifically, the periodic report enables near-real-time monitoring of streaming session performance, whereby deteriorating metrics can enable the service provider to take mitigating action to restore the intended level of performance. The aggregated metrics report is useful for the longer-term collection of statistics for streaming service performance. Hence, it is beneficial to enable the provision by the UE 14 of both kinds of report (i.e periodic and aggregated) for any individual streaming session.

The modified semantics shown below in Table 3 enable the configuration to request provision of both kinds of metrics reports in a streaming session, by adding the element aggregatedReport. This is an element of type "Boolean", which when set to "True" instructs the UE 14 to deliver an aggregated metrics report at the end of the session, independently from the now separate configuration element for periodic metrics reports. In other words, the element aggregatedReport (referred to as the "second element" below) provides a mechanism for an aggregated report to be provided irrespective of whether the periodic metrics report is provided. This enables a further combination of metrics reporting; that of both periodic and aggregated reporting which is so useful in media streaming services. Moreover, by providing the element aggregatedReport as a Boolean element means that the size of the added element is very small.

There are several ways to change the semantics of the element reportingInterval (referred to as the "first element" below) to avoid redundancy in the overall semantics, for example the current method to signal the need for the aggregated report by setting the reporting interval to zero seconds will be removed if the new element aggregatedReport is included. Adding the new element provides the mentioned benefit of allowing both kinds of report to be provided. This possibility is shown as a conditional aspect in table 3 below.

In other words, to allow both the periodic and aggregated reporting of metrics associated with a media streaming session, the instruction defining the metrics reporting using a media session control interface, the instruction comprising a first element defining the interval for periodic metrics reporting and a second element, different to the first element, defining whether aggregated metrics reporting is required.

Further, the ClientMetricsReportingConfiguration object contains the element "metrics", which is an array of string attributes that indicate individual metrics elements to be reported. This may be a valid method to convey the list of metrics to be reported to the media session handler 14C in the UE 14, but here is disclosed an additional level of method, to signal the metrics system format to be used for metrics reports. When a particular metrics system format is indicated in the metrics reporting configuration according to embodiments of the present disclosure, the list of individual metrics elements to be reported may be included or omitted, depending on the indicated metrics system format. Some metrics system formats are concise and reports using that system commonly contain all defined elements for that system, hence in this case there is no need to indicate the individual metrics elements to report. With other more extensive metrics system formats, it may be desirable to indicate the reporting of each required metrics element. In this case the list of metrics elements to be reported will be indicated after the identification of the metrics system format element.

The structure of the ClientMetricsReportingConfiguration object according to embodiments of the present disclosure can be defined as shown in Table 3 below.

In embodiments, there is a single metrics system format indicated in the configuration and report, but some services may need multiple formats to be reported in the same metrics report, hence this can be allowed.

If a single metrics system format is foreseen for reporting then the cardinality of the metrics object in table 3 is "1". If multiple metrics system formats are allowed then the cardinality of the metrics object in table 3 is "1 . . . N".

defined, in order to guarantee interoperability between the functions of UEs, network elements (e.g. the MCRS-AF) and services.

The element metricsSystemIdentifier may also be an Object with several elements, in order to provide a structure that enables interoperability and further benefits such as versioning.

One such possible metricsSystemIdentifier Object structure is depicted in table 4 below. In this example the elements specification and version are defined. The specification can be a string or a URI location that indicates the entity that specifies the metrics system format. The version number enables referencing to different published versions of the metrics system format.

TABLE 3

Amended ClientMetricsReportingConfiguration Object Structure

| ClientMetricsReportingConfiguration | Object | 0 . . . 1 | |
|---|---|---|---|
| serverAddresses | Array (URL String) | 1 . . . N | A list of 5GMSd AF addresses to which metrics reports shall be sent. (Opaque URL, following the 5GMS URL format.) |
| dataNetworkName | String | 0 . . . 1 | The DNN which shall be used when sending metrics reports. If not specified, the name of the default DN shall be used. |
| reportingInterval | DurationSec | 0 . . . 1 | The time interval, expressed in seconds, between metrics reports being sent by the Media Session Handler. The value shall be greater than zero. If the aggregateReport element is not included in the object structure specification, then when this property is omitted, a single final report shall be sent immediately after the streaming session has ended. |
| aggregatedReport | Boolean | 0 . . . 1 | If specified as an element, and included and set to "True" then the single final (aggregate) metrics report shall be sent, independently of whether periodic reports were sent. |
| samplePercentage | Percentage | 1 . . . 1 | The percentage of streaming sessions that shall report metrics, expressed as a floating point value between 0.0 and 100.0. |
| urlFilters | Array (String) | 1 . . . N | A list of filter conditions, e.g. URL patterns for which metrics reporting shall be performed. If not specified, reporting shall be done for all sessions. |
| Metrics | Object | 1 or 1 . . . N | Metrics system format and metrics (for cardinality "1"), or a list of metrics system formats and metrics which shall be reported (for cardinality "1 . . . N"). |
| metricsSystemIdentifier | String | 1 | Metrics system format identifier. |
| metricsElements | Array (String) | 0 . . . N | Metrics system format elements that are required to be reported, in the case that the complete set of elements defined within that system is not required to be reported. |

Although the naming of the new elements has been indicated throughout the description, the disclosure is not so limited. Moreover, the syntax of the metricsSystemIdentifier could take one of several forms to realise the intended functionality, but the semantics of first identifying the metrics system format then appending the list of metrics according to that system, if applicable, is the underlying purpose of the new structure of the ClientMetricsReportingConfiguration object.

The element metricsSystemIdentifier may be defined as a String. The possible contents of this element have to be

TABLE 4

MetricsSystemIdentifier Object

| MetricsSystemIdentifier | Object | 1 | Metrics system format identifier. |
|---|---|---|---|
| specification | URI | 1 | Metrics system format specification reference. |
| version | Integer | 1 | Metrics system format version. |

In embodiments, the Media AF 11A may directly send the metrics collection and reporting configuration framework to the UE 14 without adaptation. However, in other embodiments, the Media AF 11A may convert the metrics collection and reporting configuration framework into a metrics collection and reporting configuration framework that is compatible with a media format that is preferred by either the user of the UE 14, the UE 14 itself in terms of presets or the like or is preferred by the Media Content provider, subject to the target format data elements also being present within, or able to be derived from the source format. In other words, some media formats such as MPEG DASH require metric reporting on parameters that is not required for other media formats. For example, the Metric Reporting for MPEG-DASH is set out in Clause 10.6.2 of [6]. In contrast, Metrics Reporting for services that use RTP-based streaming, for example, has some different requirements, as specified for example in clause 5.3.2.3 of the PSS specification for RTP-based streaming (TS 26.234).

In embodiments, the Media AF 11A may extract the metrics report contained within the media manifest of an in-line mechanism, and send this metrics report to the Media Session Handler of the UE 14 within the Media Session Handling interface.

In embodiments, the Media AF 11A may be configured to allow the Media Content provider to discover which metrics reporting formats or schemes are supported. When provisioning a media streaming session, the content provider selects the preferred metrics format or scheme from those that the Media AF 11A is able to support, a certain metrics reporting data structure and format, so that content provider wishing to use the Media AF 11A accepts metrics reports, or aggregated metrics report data, based on that structure and format supported by the Media AF 11A. It is envisaged that the Media Content provider may select a non-supported format. In the case that this is rejected, the Media AF 11A will inform the Media Content provider of a more appropriate or supported format.

Additionally, in embodiments, the metrics collection and reporting configuration framework also defines when the metrics reporting should take place. This may be periodically during the media streaming session or may be at the end of the media streaming session or a combination of both of these. For example, the metrics reporting may occur every 1 minute during the media streaming session or in the event of an occurrence such as a buffer event within the UE 14. In embodiments, the Media AF 11A may include a location (such as the IP address) of the Metric Management layer 110A which allows the UE 14 to directly send either or both of periodic metrics reports or aggregated metrics reports to the Metric Management layer 110A. This will be explained with reference to FIG. 5. Although, in embodiments, the location may be the Metric Management layer 110A, the disclosure is not so limited and any entity outside the realm of the MNO is envisaged. This location will be provided to the Media AF 11A by the metrics collection and reporting configuration framework.

The Media Session Handler 14C returns the metrics report to the Media AF 11A when defined by the metrics collection and reporting configuration framework. If required, the Media AF 11A may convert the metrics report received from the UE 14 into a format suitable for the Media Application Service Provider 110 and returns the metrics report to the Metrics Management layer 110A, as far as the original metrics framework contains all metrics required for the target metrics format in some form, or it is possible to derive them from metric data in the source format.

In embodiments, the Service Provider may be provided an aggregated metrics report at the end of the media streaming session. The aggregated metrics report may be provided by the UE 14 or may be provided by the Media AF 11A from the individual metrics reports provided by the UE 14.

It will be appreciated that whilst the metrics collection and reporting configuration framework is being provided to the Media AF 11A, the Media AS is receiving the content to be streamed to the UE 14 from the Content Provisioning/Serving layer 110B. Accordingly, the media content and the metrics reporting information are being provided separately to the UE 14, or in the parlance of [1] are being provided "out-of-band".

As will be appreciated, the above describes returning the metrics reporting to the Media Application Service Provider. In other words, the above describes returning the metrics reporting to the Service Provider who provides the media content for streaming. However, in embodiments, it is still possible to return the metrics reporting to the network operator (sometimes referred to as the MNO), for example, in cases where the MNO implements the metrics reporting system and operates the media delivery service themselves.

The framework may be a current Metrics reporting data format such as that defined in [6] for MPEG DASH. Alternatively, the framework may include a metrics reporting data format identifier. The metrics reporting data format identifier identifies the metric data format to be used in metrics reporting. This allows the Media AF 11A to store a lookup table where the metrics reporting data format identifier indicates to the Media AF 11A which of the stored metric data formats are to be used in the metrics reporting. In embodiments, the size of the metrics reporting data format identifier is smaller in size than the metrics data format identifier strings or objects, which reduces the amount of data send over the media streaming provisioning interface.

As an example, the metrics reporting data format identifier may be number 1 which corresponds to the metrics data specified in [6], Clause 10.6.2. In some instances, the metrics reporting data format identifier may be a free-format text string which may indicate the metrics data specified in [6]. In this instance, there may be no need to maintain a centralised database, and each system can manage variants, versions and optional data within its own specifications.

Other suitable Metrics Reporting data formats include CTA-2066, or the metrics for RTP-based streaming specified in TS 26.234, or any other known Metrics Reporting data format.

Figure 6A:
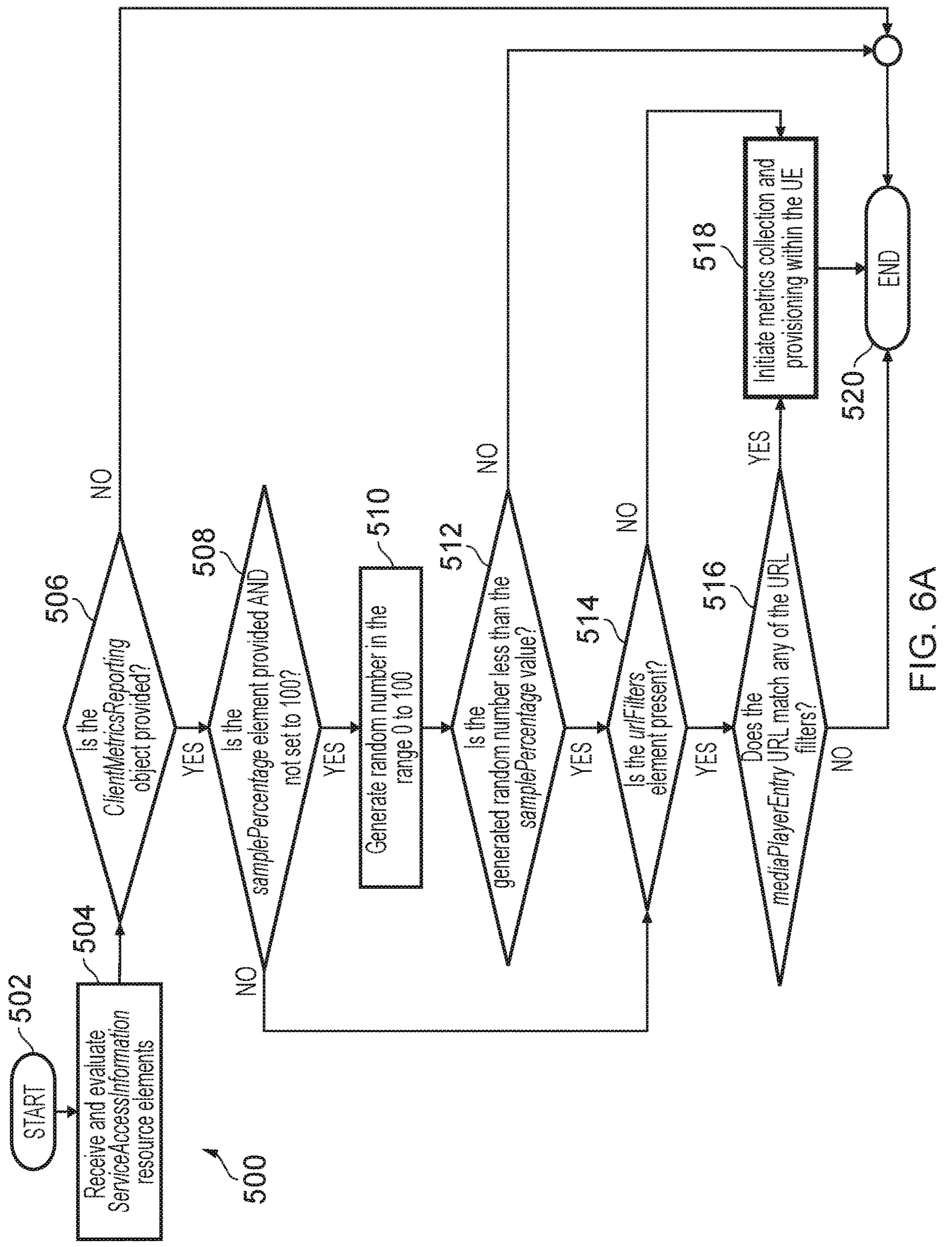
FIG. 6A shows a flow chart according to embodiments of the disclosure.

Moreover, the metrics data may be required to be compressed, as is allowed in the metrics definition contained in [2], for example using the "gzip" compression method FIG. 6A shows the metrics reporting protocol within the Media Session Handler 14C using a flow chart 500.

Before a streaming session is started, the UE 14, and in embodiments, the Media Session Handler 14C within the UE 14, checks if the Service Access Information resource contains a ClientMetricsReportingConfiguration object as in Table 3. This is step 504 and 506

If such a configuration object is present, the yes path is followed and the UE 14 (for example the Media Session Handler 14C) prepares to initiate metrics reporting based on this configuration for the current streaming session. If not, the no path is followed and the process ends at step 520

The process moves to step 508. The UE 14 (such as the Media Session Handler 14C within the UE 14) first determines whether metrics reporting is to be activated for the session, according to the samplePercentage attribute specified in the metrics reporting configuration. If the samplePercentage is not present or its value is 100.0, this means that metrics reporting is requested in any case, so metrics reporting by the UE 14 will be activated for the session. The no path will be followed to step 514.

However, if the samplePercentage element is provided and is less than 100.0, the process moves to step 512 where the UE 14 generates a random number from within a uniform distribution in the range from 0 to 100; if the generated random number is lower than the samplePercentage value in the ClientMetricsReportingConfiguration object then the yes path is followed to step 514 and UE 14 activates metrics reporting for the session. However, if the generated random number is higher than the samplePercentage value in the ClientMetricsReportingConfiguration object then the no path is followed to step 520 and the UE 14 ceases the initiation of metrics reporting for the session and does not activate metrics collection for the session.

In step 514, the UE 14 checks if filter criteria are provided, which give a further criterion for the selective reporting of metrics. Currently in the 5GMS Architecture and draft specifications, the element urlFilters enables such a condition for selective metrics reporting. However it is not clear to what parameter the filters apply. In embodiments of the present disclosure different kinds of filtering parameters are accommodated. FIG. 6A assumes the example that the filters apply to the media player entry URL. Another valid method for filtering could be on sessionId, whereby the ASP manages sessionId allocations in order to be able to regulate functions like metrics reporting based on a sample of sessions within the whole set of sessions that are launched with the ASP. The latter type of filter is allowed according to the disclosure but is not explicitly depicted in FIG. 6A.

Some filter criteria can be valid for the provisioning resource but not for the UE metrics reporting configuration resource.

It is also foreseen that the Media AF 11A acts upon the filters and itself imposes the conditions of metrics reporting on the UE 14 via the metrics reporting configuration interface within M5d.

If filter criteria are provided then in step 516 the UE checks whether a match exists for the parameters of the present streaming session.

If metrics reporting for this session is active in step 514, the UE 14 determines, for example using the Media Session Handler 14C requests the required metrics reporting parameter values regularly from the Media Player 14D via the M7d UE-internal interface and reports these values periodically to the Media AF 11A, according to the reportingInterval element value specified in the ClientMetricsReportingConfiguration object.

The Media AF 11A is identified by a network address, for example a URL (string). One Media AF address corresponds to one instance of the serverAddresses array of elements within the ClientMetricsReportingConfiguration object. Metrics reports in the requested format and with the requested metrics contents are sent by the UE 14 to the Media AF 11A, either to one Media AF 11A or a plurality of Media AFs, as indicated by the element serverAddresses in the ClientMetricsReportingConfiguration object.

It should be noted that the flow diagram in FIG. 6A is valid for the definition of the ClientMetricsReportingConfiguration object as depicted in table 3 above. Obviously, if the object structure omits any of the cited elements then the sequence is different, but the general principles of the remaining steps still apply. Similarly this holds of additional elements are present in the structure and they are added in the sequence of verification of the requirement for the UE 14 to provide metrics reports.

Figure 6B:
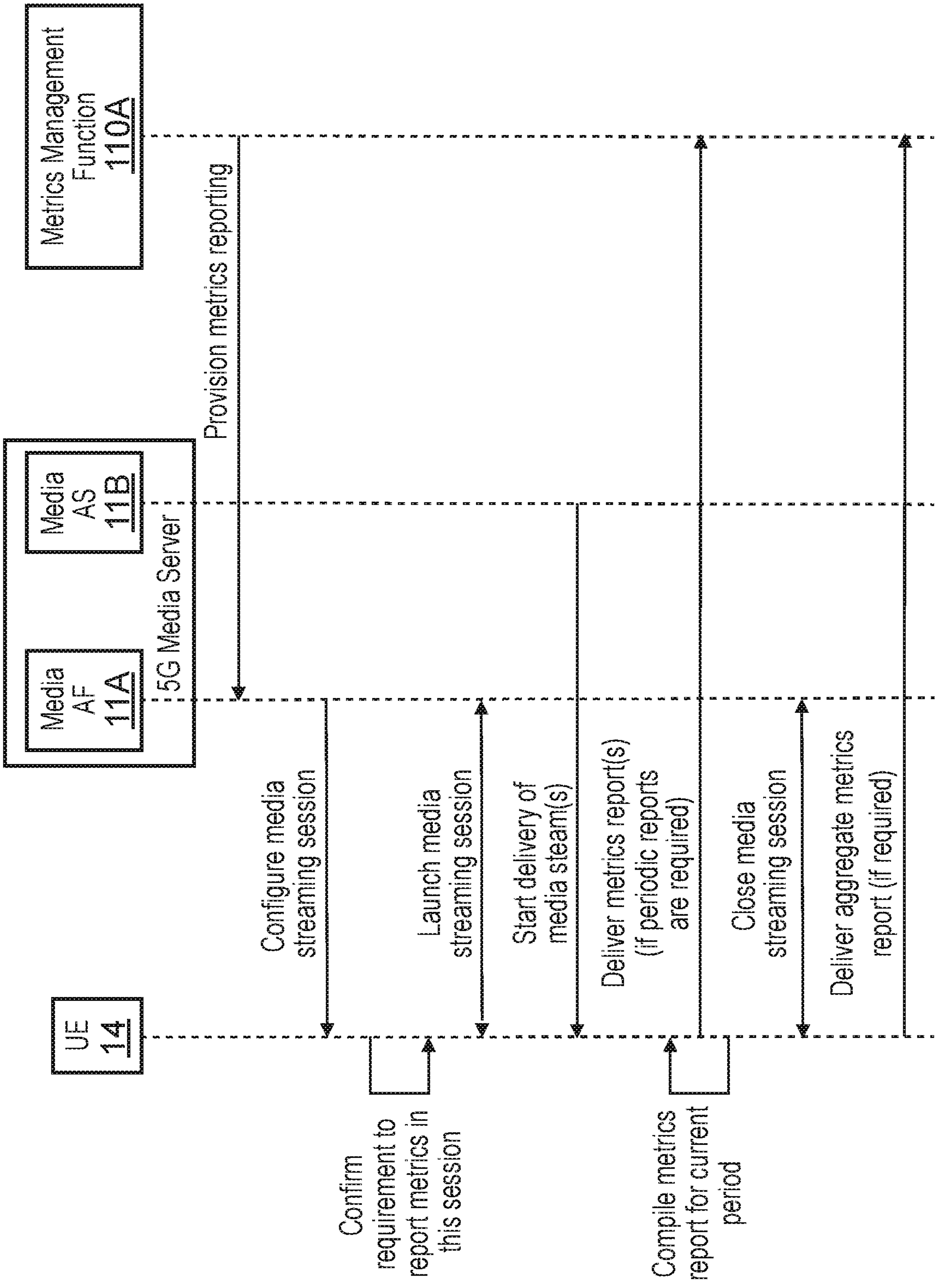
FIG. 6B shows a sequence diagram according to embodiments of the disclosure.

FIG. 6B shows a sequence diagram for the metrics reporting configuration and metrics reporting protocol between the UE 14 and the Media AF 11A and the metrics management function 110A.

Metrics reports, whether periodic or the aggregated report, are delivered, in embodiments, as payload in an HTTP POST message to the Media AF 11A and/or the metrics management function 110A. In the media network of embodiments of the disclosure, often a RESTful protocol is used, but in the case of metrics reporting the protocol is simple enough to be designed on the basis of communications between the UE 14 and Media AF 11A and/or metrics management function 110A being realized via HTTP POST messages in either direction, i.e. for the configuration of metrics reporting, if performed separately from provision of aggregated service access information, and for the metrics reports.

The framework for the metrics reporting configuration and metrics reporting API is defined, in embodiments, as follows.

A metrics reporting data resource is defined, which allows the UE 14, and for example the Media Session Handler 14C within the UE 14, to send the metrics report data, if Metrics Reporting is activated for a media streaming session.

The resource is defined in terms of the Resource URI as follows:

{apiRoot}/3gpp-5gms-metrics-reporting/v1{aspId}/
session/{sessionId}

This resource shall support the resource URI variables defined in table 3 below.

TABLE 5

Resource URI Variables for Resource "MetricsReportingData"

| Name | Definition |
|---|---|
| apiRoot | See clause 5.2.4 of TS 29.122 [x3]. |
| aspId | Identifier of the 5GMS Application Provider. |
| sessionId | Identifier of the 5GMS Downlink Streaming session. |

The POST method allows the UE 14, and for example from the Media Session Handler 14C, to send metrics data. It is initiated by the UE 14 and acknowledged by the Media AF 11A and/or metrics management function 110A as appropriate.

This method supports request and response data structures, and response codes, as specified in the Table 6 below.

TABLE 6

Data Structures supported by the POST request/response by the Resource

| Request body | Data type | Cardinality | Remarks |
|---|---|---|---|
| | MetricsReporting | 1 . . . 1 | Metrics Reporting data to send to the Media AF. |

TABLE 6-continued

| Data Structures supported by the POST request/response by the Resource | | | | |
|---|---|---|---|---|
| Response body | Data type | Cardinality | Response codes | Remarks |
| | None | | 200 OK | The metrics reporting data is received by the Media AF. |

NOTE:
The usual mandatory HTTP error status codes for the POST method apply in addition.

Figure 7:
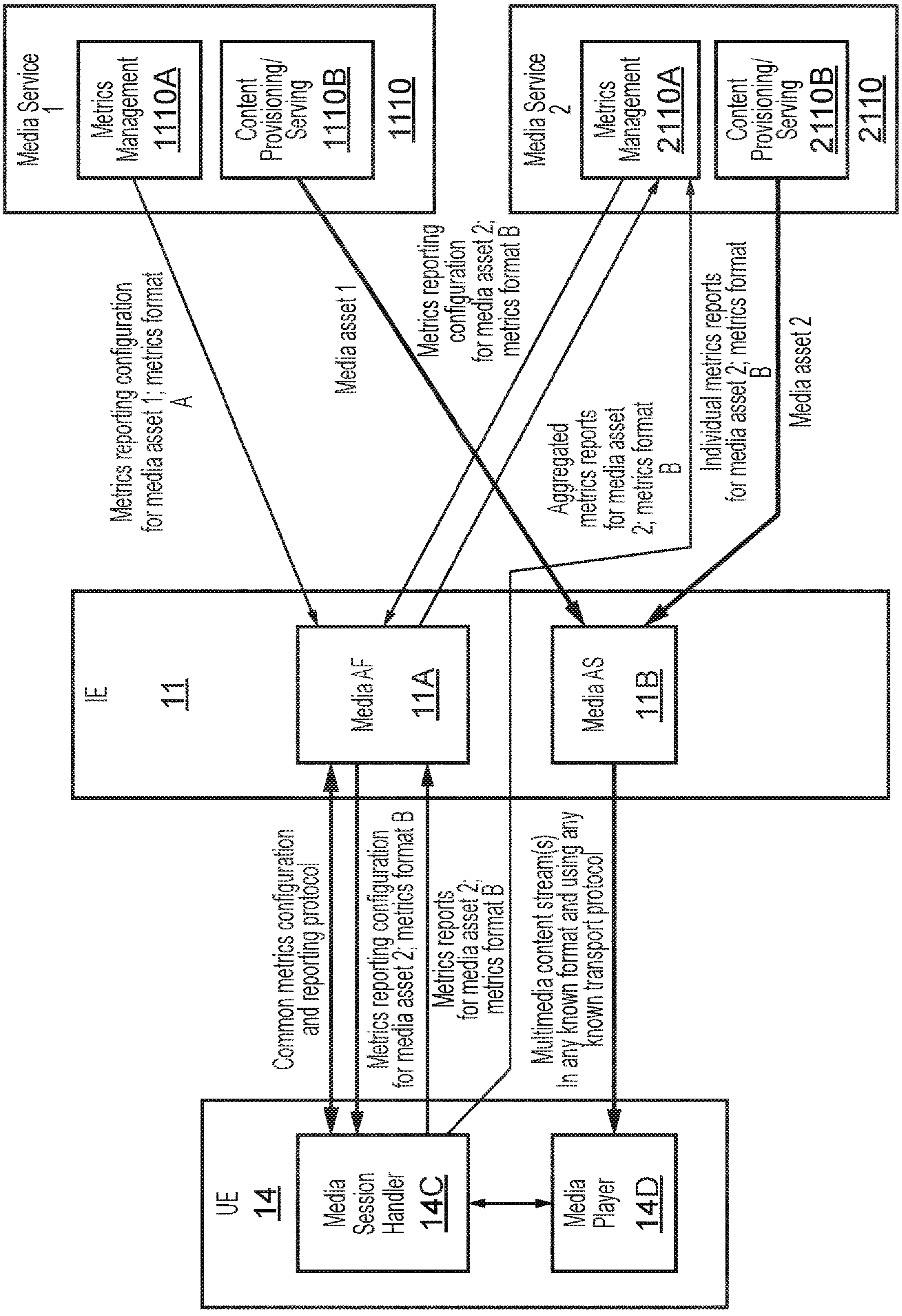
FIG. 7 schematically shows a media architecture according to embodiment of the disclosure when there are two media content providers.

FIG. 7 shows the system of FIG. 4 with two content providers. As is evident from FIG. 7, it is possible for the UE 14 to receive content in two different formats from two different content providers (Media Service 1 and Media Service 2). In the example of Media Service 1, this provides streaming content in the form of media asset 1 and the corresponding metric reporting configuration for media asset 1 as metrics format A.

Specifically, Media Service 1 provides the metric reporting configuration to the Media AF 11A. This is provided as the metrics collection and reporting configuration framework which may be the metrics reporting data format identifier or may be a Metrics Reporting data format. Media Service 1 provides the media asset (media asset 1) to the Media AS 11B. Although not specifically shown for clarity, the Media AF 11A sends the metrics configuration for media asset 1 to the Media Session Handler 14C and receives the Metrics reports from the Media Session Handler 14C periodically or aggregated. The Media Service 1 will then receive the metrics from the Media AF 11A as required by the metrics collection and reporting configuration framework.

With regard to Media Service 2, this provides streaming content in the form of media asset 2 and the corresponding metric reporting configuration for media asset 2 as metrics format B. Specifically, Media Service 2 provides the metric reporting configuration to the Media AF 11A. This is provided as the metrics collection and reporting configuration framework which may be the metrics reporting data format identifier or may be a Metrics Reporting data format. Media Service 2 provides the media asset (media asset 2) to the Media AS 11B. In a similar way to the mechanism described above, the Media AF 11A sends the metrics configuration for media asset 2 to the Media Session Handler 14C and receives the Metrics reports from the Media Session Handler 14C periodically. However, in this instance, the Media Session Handler 14C also sends the Metrics Reports periodically to the metrics management layer 2110A of media service 2. The aggregated metrics report, in this embodiment, is then prepared by the Media AF 11A and is sent to the Metrics Management layer 2110A. In other words, in the embodiment of Media Service 2, the individual metrics reports are sent to the Metrics Management 2110A by the UE 14 and the aggregated metrics reports are sent via the Media AF 11A.

Figure 8A:
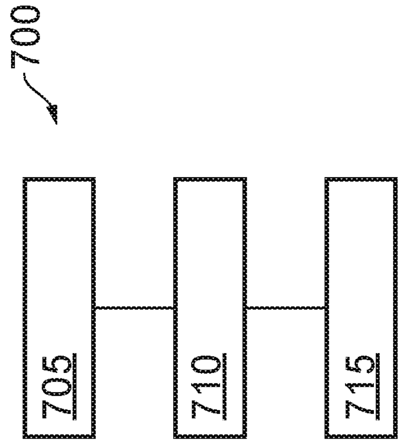
FIGS. 8A and 8B show two processes carried out in the infrastructure equipment 11.
Figure 8B:
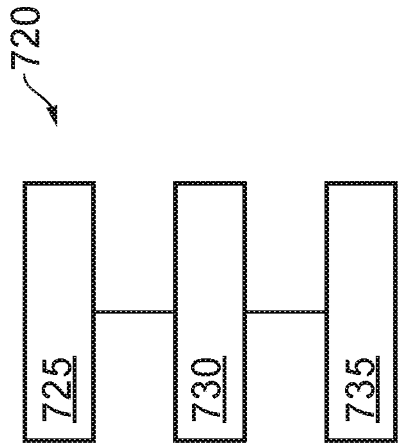

FIGS. 8A and 8B show a flow chart of two processes at the infrastructure 11.

Referring to FIG. 8A, the process 700 starts at step 705. The process moves to step 710 where processing circuitry 11-2 is configured to control the transceiver circuitry 11-1 to: provide a metrics collection and reporting configuration framework to an application function using a media streaming provisioning interface, the metrics collection and reporting configuration framework defining the metrics to be collected and reported for a media session over the media streaming network.

The process 700 then moves to step 715 where the process ends.

In other embodiments, a second process 720 is provided. This is shown in FIG. 8B. In this second process, the process starts at step 725. The process moves to step 730, where processing circuitry 11-2 is configured to control the transceiver circuitry 11-1 to: send an instruction defining the metrics reporting using a media session control interface, the instruction comprising a first element defining the interval for periodic metrics reporting and a second element, different to the first element, defining whether aggregated metrics reporting is required.

The process 720 then moves to step 735 where the process ends.

Figure 9:
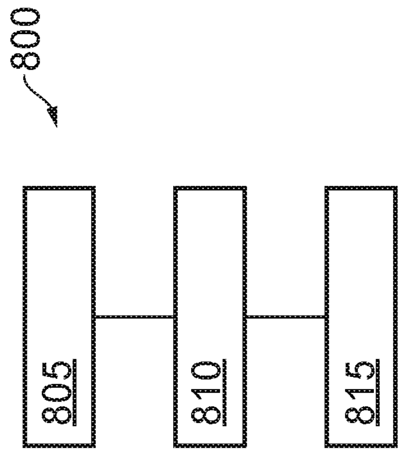
FIG. 9 shows a process carried out in the UE 14.

FIG. 9 shows a flow chart of a process at the UE 14.

Referring to FIG. 9, the process 800 starts at step 805. The process moves to step 810 where processing circuitry 14-2 is configured to control the transceiver circuitry 14-1 to: receive an instruction defining the metrics reporting using a media session control interface, the instruction comprising a first element defining the interval for periodic metrics reporting and a second element, different to the first element, defining whether aggregated metrics reporting is required.

The process 800 then moves to step 815 where the process ends.

Those skilled in the art would appreciate that the method shown by Figure may be adapted in accordance with embodiments of the present technique. For example, other preliminary, intermediate, or subsequent steps as described herein may be included in the method, or the steps may be performed in any logical order.

Though embodiments of the present technique have been described largely by way of the example communications system shown in the Figures, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

1. A method of metrics collection and reporting in a service based architecture media streaming network, the method comprising the steps of:

providing a metrics collection and reporting configuration framework to an application function using a media streaming provisioning interface, the metrics collection and reporting configuration framework defining the metrics to be collected and reported for a media session over the media streaming network.

2. A method according to clause 1, comprising: converting the metrics collection and reporting configuration framework to metrics reporting data format that is compatible with a media format and is different to the metrics collection and reporting configuration framework.

3. A method according to clause 1 or clause 2, wherein the metrics collection and reporting configuration framework is a metrics reporting data format identifier that identifies the metric data format to be used in metrics collection and reporting.

4. A method according to clause 3, wherein the metrics reporting data format identifier is smaller in size than the metrics data format that it identifies.

5. A method according to either clause 3 or 4, wherein the metrics reporting data format identifier is either a number or a free-format text string or a structured data object.

6. A method according to any preceding clause, wherein the metrics collection and reporting configuration framework includes a location indicating to where the metrics reports are to be provided.

7. A method according to clause 6, wherein the location is outside the network domain of the mobile network operator that operates the media streaming network.

8. A method according to any preceding clause, comprising sending, from the application function to a user terminal, a metrics reporting object that includes a metrics system format used to collect and report the metrics.

9. A method of instructing a user equipment to provide metrics reporting associated with a media streaming session, comprising: sending an instruction defining the metrics reporting using a media session control interface, the instruction comprising a first element defining the interval for periodic metrics reporting and a second element, different to the first element, defining whether aggregated metrics reporting is required.

10. A method according to clause 9, wherein the second element is a Boolean element type.

11. A method according to either one of clauses 9 or 10, wherein the instruction includes a filter that enables selective metrics reporting.

12. A method according to any one of clauses 9, 10 or 11, wherein the instruction is of the form

| ClientMetricsReportingConfiguration | Object | 0 . . . 1 | |
|---|---|---|---|
| serverAddresses | Array(URL String) | 1 . . . N | A list of 5GMSd AF addresses to which metrics reports shall be sent. (Opaque URL, following the 5GMS URL format.) |
| dataNetworkName | String | 0 . . . 1 | The DNN which shall be used when sending metrics reports. If not specified, the name of the default DN shall be used. |
| reportingInterval | DurationSec | 0 . . . 1 | The time interval, expressed in seconds, between metrics reports being sent by the Media Session Handler. The value shall be greater than zero.<br>If the aggregateReport element is not included in the object structure specification, then when this property is omitted, a single final report shall be sent immediately after the streaming session has ended. |
| aggregatedReport | Boolean | 0 . . . 1 | If specified as an element, and included and set to "True" then the single final (aggregate) metrics report shall be sent, independently of whether periodic reports were sent. |
| samplePercentage | Percentage | 1 . . . 1 | The percentage of streaming sessions that shall report metrics, expressed as a floating point value between 0.0 and 100.0. |
| urlFilters | Array(String) | 1 . . . N | A list of filter conditions, e.g. URL patterns for which metrics reporting shall be performed.<br>If not specified, reporting shall be performed for all sessions. |
| Metrics | Object | 1 or 1 . . . N | Metrics system format and metrics (for cardinality "1"), or a list of metrics system formats and metrics which shall be reported (for cardinality "1 . . . N"). |
| metricsSystemIdentifier | String | 1 | Metrics system format identifier. |
| metricsElements | Array(String) | 0 . . . N | Metrics system format elements that are required to be reported, in the case that the complete set of elements defined within that system is not required to be reported. |

and the first element is the reportingInterval element and the second element is the aggregatedReport element.

13. A method according to clause 12, wherein the metricsSystemIdentifier element is of the form

| MetricsSystemIdentifier | Object | 1 | Metrics system format identifier. |
|---|---|---|---|
| specification | URI | 1 | Metrics system format specification reference. |
| version | Integer | 1 | Metrics system format version. |

14. A method of receiving an instruction at a user equipment to provide metrics reporting associated with a media streaming session, comprising: receiving an instruction defining the metrics reporting using a media session control interface, the instruction comprising a first element defining the interval for periodic metrics reporting and a second element, different to the first element, defining whether aggregated metrics reporting is required.

15. A method according to clause 14, wherein the second element is a Boolean element type.

16. A method according to either one of clauses 14 or 15, wherein the instruction includes a filter that enables selective metrics reporting.

17. A method according to any one of clauses 14, 15 or 16, wherein the instruction is of the form

| ClientMetricsReportingConfiguration | Object | 0 . . . 1 | |
|---|---|---|---|
| serverAddresses | Array(URL String) | 1 . . . N | A list of 5GMSd AF addresses to which metrics reports shall be sent. (Opaque URL, following the 5GMS URL format.) |
| dataNetworkName | String | 0 . . . 1 | The DNN which shall be used when sending metrics reports. If not specified, the name of the default DN shall be used. |
| reportingInterval | DurationSec | 0 . . . 1 | The time interval, expressed in seconds, between metrics reports being sent by the Media Session Handler. The value shall be greater than zero. If the aggregateReport element is not included in the object structure specification, then when this property is omitted, a single final report shall be sent immediately after the streaming session has ended. |
| aggregatedReport | Boolean | 0 . . . 1 | If specified as an element, and included and set to "True" then the single final (aggregate) metrics report shall be sent, independently of whether periodic reports were sent. |
| samplePercentage | Percentage | 1 . . . 1 | The percentage of streaming sessions that shall report metrics, expressed as a floating point value between 0.0 and 100.0. |
| urlFilters | Array(String) | 1 . . . N | A list of filter conditions, e.g. URL patterns for which metrics reporting shall be performed. If not specified, reporting shall be performed for all sessions. |
| Metrics | Object | 1 or 1 . . . N | Metrics system format and metrics (for cardinality "1"), or a list of metrics system formats and metrics which shall be reported (for cardinality "1 . . . N"). |
| metricsSystemIdentifier | String | 1 | Metrics system format identifier. |
| metricsElements | Array(String) | 0 . . . N | Metrics system format elements that are required to be reported, in the case that the complete set of elements defined within that system is not required to be reported. |

and the first element is the reportingInterval element and the second element is the aggregatedReport element.

18. A method according to clause 17, wherein the metricsSystemIdentifier element is of the form

| MetricsSystemIdentifier | Object | 1 | Metrics system format identifier. |
|---|---|---|---|
| specification | URI | 1 | Metrics system format specification reference. |
| version | Integer | 1 | Metrics system format version. |

19. A computer program product which, when loaded onto a computer, configures the computer to perform a method according to any one of clauses 1 to 18.

20. Infrastructure Equipment for metrics collection and reporting in a service based architecture media streaming network, the Infrastructure Equipment comprising:

configured to provide a metrics collection and reporting configuration framework to an application function using a media streaming provisioning interface, the metrics collection and reporting configuration framework defining the metrics to be collected and reported for a media session over the media streaming network.

21. Infrastructure Equipment according to clause 20, wherein the circuitry is configured to convert the metrics collection and reporting configuration framework to metrics reporting data format that is compatible with a media format and is different to the metrics collection and reporting configuration framework.

22. Infrastructure Equipment according to clause 20 or clause 21, wherein the metrics collection and reporting configuration framework is a metrics reporting data format identifier that identifies the metric data format to be used in metrics collection and reporting.

23. Infrastructure Equipment according to clause 22, wherein the metrics reporting data format identifier is smaller in size than the metrics data format that it identifies.

24. Infrastructure Equipment according to either clause 22 or 23, wherein the metrics reporting data format identifier is either a number or a free-format text string or a structured data object.

25. Infrastructure Equipment according to any one of clauses 20 to 24, wherein the metrics collection and reporting configuration framework includes a location indicating to where the metrics reports are to be provided.

26. Infrastructure Equipment according to clause 25, wherein the location is outside the network domain of the mobile network operator that operates the media streaming network.

27. Infrastructure Equipment according to any one of clauses 20 to 26, wherein the circuitry is configured to send, from the application function to a user terminal, a metrics reporting object that includes a metrics system format used to collect and report the metrics.

28. Infrastructure Equipment for providing metrics reporting associated with a media streaming session, comprising circuitry configured to send an instruction defining the metrics reporting using a media session control interface, the instruction comprising a first element defining the interval for periodic metrics reporting and a second element, different to the first element, defining whether aggregated metrics reporting is required.

29. Infrastructure Equipment according to clause 28, wherein the second element is a Boolean element type.

30. Infrastructure Equipment according to either one of clauses 28 or 29, wherein the instruction includes a filter that enables selective metrics reporting.

31. Infrastructure Equipment according to any one of clauses 28, 29 or 30, wherein the instruction is of the form

| ClientMetricsReportingConfiguration | Object | 0 . . . 1 | |
|---|---|---|---|
| serverAddresses | Array(URL String) | 1 . . . N | A list of 5GMSd AF addresses to which metrics reports shall be sent. (Opaque URL, following the 5GMS URL format.) |
| dataNetworkName | String | 0 . . . 1 | The DNN which shall be used when sending metrics reports. If not specified, the name of the default DN shall be used. |
| reportingInterval | DurationSec | 0 . . . 1 | The time interval, expressed in seconds, between metrics reports being sent by the Media Session Handler. The value shall be greater than zero. If the aggregateReport element is not included in the object structure specification, then when this property is omitted, a single final report shall be sent immediately after the streaming session has ended. |
| aggregatedReport | Boolean | 0 . . . 1 | If specified as an element, and included and set to "True" then the single final (aggregate) metrics report shall be sent, independently of whether periodic reports were sent. |
| samplePercentage | Percentage | 1 . . . 1 | The percentage of streaming sessions that shall report metrics, expressed as a floating point value between 0.0 and 100.0. |
| urlFilters | Array(String) | 1 . . . N | A list of filter conditions, e.g. URL patterns for which metrics reporting shall be performed. If not specified, reporting shall be performed for all sessions. |
| Metrics | Object | 1 or 1 . . . N | Metrics system format and metrics (for cardinality "1"), or a list of metrics system formats and metrics which shall be reported (for cardinality "1 . . . N"). |
| metricsSystemIdentifier | String | 1 | Metrics system format identifier. |
| metricsElements | Array(String) | 0 . . . N | Metrics system format elements that are required to be reported, in the case that the complete set of elements defined within that system is not required to be reported. |

and the first element is the reportingInterval element and the second element is the aggregatedReport element.

32. A method according to clause 31, wherein the metricsSystemIdentifier element is of the form

| MetricsSystemIdentifier | Object | 1 | Metrics system format identifier. |
|---|---|---|---|
| specification | URI | 1 | Metrics system format specification reference. |
| version | Integer | 1 | Metrics system format version. |

33. A terminal device for receiving an instruction to provide metrics reporting associated with a media streaming session, comprising circuitry configured to: receive an instruction defining the metrics reporting using a media session control interface, the instruction comprising a first element defining the interval for periodic metrics reporting and a second element, different to the first element, defining whether aggregated metrics reporting is required.

34. A terminal device according to clause 33, wherein the second element is a Boolean element type.

35. A terminal device according to either one of clauses 33 or 34, wherein the instruction includes a filter that enables selective metrics reporting.

36. A terminal device according to any one of clauses 33, 34 or 35, wherein the instruction is of the form

| ClientMetricsReportingConfiguration | Object | 0 . . . 1 | |
|---|---|---|---|
| serverAddresses | Array(URL String) | 1 . . . N | A list of 5GMSd AF addresses to which metrics reports shall be sent. (Opaque URL, following the 5GMS URL format.) |
| dataNetworkName | String | 0 . . . 1 | The DNN which shall be used when sending metrics reports. If not specified, the name of the default DN shall be used. |
| reportingInterval | DurationSec | 0 . . . 1 | The time interval, expressed in seconds, between metrics reports being sent by the Media Session Handler. The value shall be greater than zero. If the aggregateReport element is not included in the object structure specification, then when this property is omitted, a single final report shall be sent immediately after the streaming session has ended. |
| aggregatedReport | Boolean | 0 . . . 1 | If specified as an element, and included and set to "True" then the single final (aggregate) metrics report shall be sent, independently of whether periodic reports were sent. |
| samplePercentage | Percentage | 1 . . . 1 | The percentage of streaming sessions that shall report metrics, expressed as a floating point value between 0.0 and 100.0. |
| urlFilters | Array(String) | 1 . . . N | A list of filter conditions, e.g. URL patterns for which metrics reporting shall be performed. If not specified, reporting shall be performed for all sessions. |
| Metrics | Object | 1 or 1 . . . N | Metrics system format and metrics (for cardinality "1"), or a list of metrics system formats and metrics which shall be reported (for cardinality "1 . . . N"). |
| metricsSystemIdentifier | String | 1 | Metrics system format identifier. |
| metricsElements | Array(String) | 0 . . . N | Metrics system format elements that are required to be reported, in the case that the complete set of elements defined within that system is not required to be reported. |

and the first element is the reportingInterval element and the second element is the aggregatedReport element.

37. A terminal device according to clause 36, wherein the metricsSystemIdentifier element is of the form

| MetricsSystemIdentifier | Object | 1 | Metrics system format identifier. |
|---|---|---|---|
| Specification | URI | 1 | Metrics system format specification reference. |
| Version | Integer | 1 | Metrics system format version. |

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 26.501 V16.3.0 "5G Media Streaming (5GMS) General Description and Architecture"

[2] 3GPP TS 26.247 V16.3.0 "Technical Specification Group Services and System Aspects; Transparent end-to-end Packet-switched Streaming Service (PSS); Progressive Download and Dynamic Adaptive Streaming over HTTP (3GP-DASH)"

[3] Holma H. and Toskala A, "LTE for UMTS OFDMA and SC-FDMA based radio access", John Wiley and Sons, 2009.

[4] 3GPP TS 23.501 V16.4.0 "System Architecture for the 5G System"

[5] 3GPP TS 26.512 V1.2.0 "5G Media Streaming (5GMS) Protocols"

[6] 3GPP TS 26.247 V16.3.0 "Transparent end-to-end Packet-switched Streaming Service (PSS); Progressive Download and Dynamic Adaptive Streaming over HTTP (3GP-DASH)"

[7] CTA 2066: CTA Standard; Streaming Quality of Experience Events, Properties and Metrics (March 2020)

[8] IETF RFC 7230: "Hypertext-Transfer Protocol (HTTP/1.1): Message Syntax and Routing".

[9] IETF RFC 7231: "Hypertext-Transfer Protocol (HTTP/1.1): Semantics and Content".

What is claimed is:

1. A method of metrics collection and reporting in a service based architecture media streaming network, the method comprising the steps of:

providing a first metrics collection and reporting configuration framework to an application function using a media streaming provisioning interface; and converting the first metrics collection and reporting configuration framework to a second metrics collection and reporting configuration framework, the first and second metrics collection and reporting configuration frameworks each being metrics reporting data formats defining metrics to be collected and reported for a media stream streamed over a media session over the media streaming network, wherein the second metrics collection and reporting configuration framework is:

compatible with a media format of the media stream streamed over the media session; and different than the first metrics collection and reporting configuration framework.

2. The method according to claim 1, wherein the metrics collection and reporting configuration framework is a metrics reporting data format identifier that identifies the metric data format to be used in metrics collection and reporting.

3. The method according to claim 1, wherein the metrics reporting data format identifier is smaller in size than the metrics data format that it identifies.

4. The method according to claim 1, wherein the metrics reporting data format identifier is either a number or a free-format text string or a structured data object.

5. The method according to claim 1, wherein the metrics collection and reporting configuration framework includes a location indicating to where the metrics reports are to be provided.

6. The method according to claim 5, wherein the location is outside the network domain of the mobile network operator that operates the media streaming network.

7. The method according claim 1, comprising sending, from the application function to a user terminal, a metrics reporting object that includes a metrics system format used to collect and report the metrics.

8. A non-transitory computer readable medium storing a computer program that, when loaded onto a computer, causes a computer to:

provide a first metrics collection and reporting configuration framework to an application function using a media streaming provisioning interface; and convert the first metrics collection and reporting configuration framework to a second metrics collection and reporting configuration framework, the first and second metrics collection and reporting configuration frameworks each being metrics reporting data formats defining metrics to be collected and reported for a media stream streamed over a media session over the media streaming network, wherein the second metrics collection and reporting configuration framework is:

compatible with a media format of the media stream streamed over the media session;

different than the first metrics collection and reporting configuration framework.

9. An Infrastructure Equipment for metrics collection and reporting in a service based architecture media streaming network, the Infrastructure Equipment comprising:

processor circuitry configured to provide a first metrics collection and reporting configuration framework to an application function using a media streaming provisioning interface;

wherein the processor circuitry is stored inside the infrastructure equipment, and wherein the processor circuitry is configured to convert the first metrics collection and reporting configuration framework to a second metrics collection and reporting configuration framework, the first and second metrics collection and reporting configuration frameworks each being metrics reporting data formats defining metrics to be collected and reported for a media stream streamed over a media session over the media streaming network, wherein the second metrics collection and reporting configuration framework is:

compatible with a media format of the media stream streamed over the media session; and different than the first metrics collection and reporting configuration framework.

10. The Infrastructure Equipment according to claim 9, wherein the metrics collection and reporting configuration framework is a metrics reporting data format identifier that identifies the metric data format to be used in metrics collection and reporting.

11. The Infrastructure Equipment according to claim 10, wherein the metrics reporting data format identifier is smaller in size than the metrics data format that it identifies.

12. The Infrastructure Equipment according to claim 10, wherein the metrics reporting data format identifier is either a number or a free-format text string or a structured data object.

13. The Infrastructure Equipment according claim 9, wherein the metrics collection and reporting configuration framework includes a location indicating to where the metrics reports are to be provided.

14. The Infrastructure Equipment according to claim 13, wherein the location is outside the network domain of the mobile network operator that operates the media streaming network.

15. The Infrastructure Equipment according to claim 9, wherein the processor circuitry is configured to send, from the application function to a user terminal, a metrics reporting object that includes a metrics system format used to collect and report the metrics.

16. The non-transitory computer readable medium according to claim 8, wherein the metrics collection and reporting configuration framework is a metrics reporting data format identifier that identifies the metric data format to be used in metrics collection and reporting.

17. The non-transitory computer readable medium according to claim 16, wherein the metrics reporting data format identifier is smaller in size than the metrics data format that it identifies.

18. The non-transitory computer readable medium according to claim 17, wherein the metrics reporting data format identifier is either a number or a free-format text string or a structured data object.

19. The non-transitory computer readable medium according to claim 8, wherein the metrics collection and reporting configuration framework includes a location indicating to where the metrics reports are to be provided.

20. The method according to claim 1, wherein the media format is one of a media format that is preferred by a user of the user equipment hosting the application function, present by the user equipment, or preferred by a media content provider of the streamed media.

* * * * *